United States Patent [19]

Maher

[11] 4,303,282
[45] Dec. 1, 1981

[54] FOOD PROCESSOR AND BEARING

[75] Inventor: William M. Maher, Churchville, N.Y.

[73] Assignee: General Electric Company, New York, N.Y.

[21] Appl. No.: 137,516

[22] Filed: Apr. 4, 1980

[51] Int. Cl.³ .............................................. F16C 1/24
[52] U.S. Cl. .................................. 308/36; 308/134.1; 308/240; 241/282.1
[58] Field of Search ...................... 308/240, 134.1, 36, 308/121, 168, DIG. 5; 241/92, 282.1

[56] References Cited

U.S. PATENT DOCUMENTS

| | | |
|---|---|---|
| 2,233,880 | 3/1941 | Ballman . |
| 2,539,072 | 1/1951 | Gordon et al. ...................... 308/240 |
| 2,571,868 | 10/1951 | Haller .................................. 308/240 |
| 2,722,114 | 11/1955 | Kochner . |
| 2,725,265 | 11/1955 | Daniels et al. .................. 308/240 X |
| 3,529,873 | 9/1970 | Spieth ............................. 308/240 X |
| 3,709,324 | 1/1973 | Iwasawa . |
| 3,945,695 | 3/1976 | Speakman ........................... 308/240 |

FOREIGN PATENT DOCUMENTS 1008058  5/1957  Fed. Rep. of Germany ... 308/134.1

*Primary Examiner*—William D. Martin, Jr.
*Attorney, Agent, or Firm*—John F. Cullen; George R. Powers; Leonard J. Platt

[57]  ABSTRACT

A food processor includes a power unit in a base connected to drive a rotatable hub mounted on a vertically-oriented drive shaft extending into a removable bowl with cutting means on the shaft. To this general combination an improvement has the shaft stepfitted into a porous oil-impregnated sleeve bearing that is fixedly press-fitted into and carried from the base within the hub. The bearing thus vertically and rotatably supports and lubricates the shaft. A radially extending flange with upper and lower surfaces, is provided on the top of the bearing. Spaced vertical channels are provided in the inner and outer bearing surfaces to extend the length of the bearing from the top flange end to the lower sleeve end in the base. Circular oil collecting grooves are disposed in the upper and lower radial flange surfaces with the grooves connected respectively to the inner and outer channels. This structural arrangement permits oil migrating up the bearing surfaces to be blocked from entering the bowl and collected in the grooves and directed back down the channels into the base.

6 Claims, 5 Drawing Figures

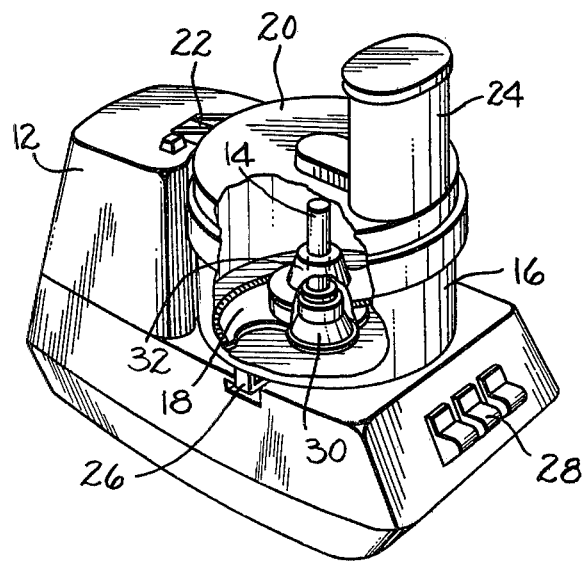
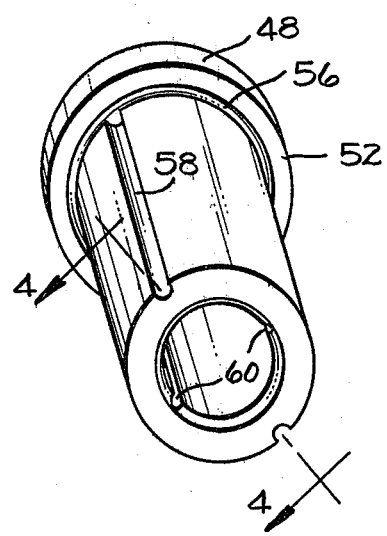
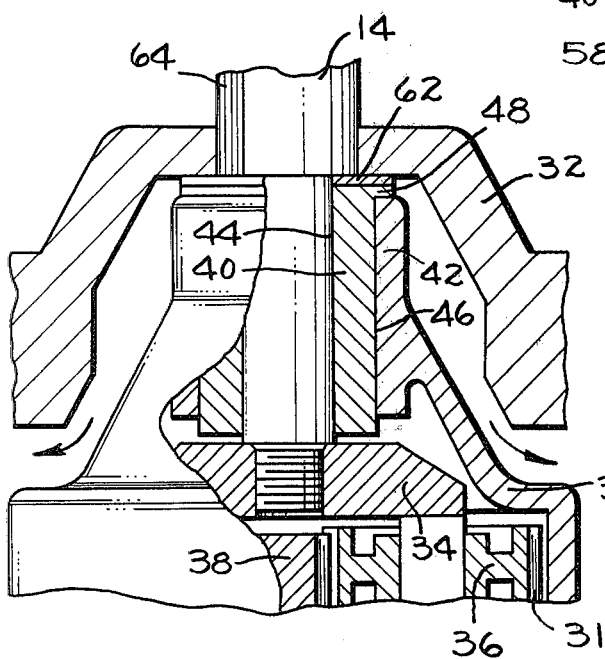
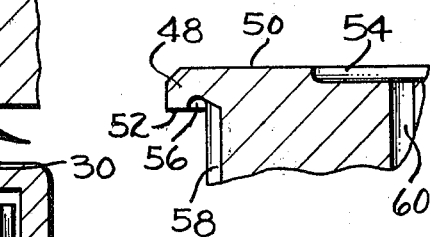

FOOD PROCESSOR AND BEARING

BACKGROUND OF THE INVENTION

1. Field of the Invention

The invention herein pertains to a bearing in combination with a food processor or appliance where lubricating oil would contaminate the food and which arrangement is such that any oil migrating up into the food processor along a driven shaft is captured and returned to the sump housing of the appliance.

2. Description of the Prior Art

Rotary cutting blade food processors, which operate in the area of 2000 rpm between mixers and blenders, have come into wide use. They generally consist of a power unit in a base, which is direct or belt-connected, to drive a rotatable hub that is mounted on a vertically-oriented drive shaft extending into a removable bowl. Suitable cutting means on the shaft processes the food that is directed into the bowl through a chute. Some appliances use intermediate transmissions that allow the processor to be driven at different speeds for different processing operations. Typical of such devices is shown in U.S. Pat. No. 4,153,210 of common assignment which is directed to a unique transmission/processor arrangement such that the correct speed is automatically selected by the bowl mounted on the processor. Additionally, the use of porous bronze bearings which are impregnated with lubricating oil are well known in many applications. Also the use of spiral grooves on a rotatable shaft wherein oil is collected and then returned to a sump through the grooves is well known. Typical of such devices is the porous bearing in U.S. Pat. No. 2,722,114 and drive shaft spiral grooves of U.S. Pat. No. 2,810,614 with typical collector grooves shown in U.S. Pat. No. 3,109,684. All of these features in separate and distinct applications are well known.

An object of the present invention is to provide, in a food processor where oil from the transmission inherently may leak into the food bowl, a construction that collects migrating oil and returns it to the transmission housing preventing entry to the bowl area.

Another object is to provide such a device wherein the arrangement of parts effectively blocks any entrance of oil to the food being processed.

A still further object is to provide a bearing of the general type disclosed in combination with a food appliance which but may have use in other types of appliances or any place food is being handled.

SUMMARY OF THE INVENTION

Briefly described, the invention is directed to a bearing and to a combination food processor/bearing of the type having a power unit in the base connected to drive a rotatable hub mounted on a vertically-oriented drive shaft extending into a removable bowl and with cutting means in the bowl on the shaft. To this arrangement an improvement is made wherein the drive shaft is step-fitted into a sleeve bearing that is fixed to the base and extends vertically within the hub. The bearing vertically and rotatably supports and lubricates the shaft since it is a porous oil-impregnated vertical sleeve bearing. The sleeve bearing is provided with a radially extending flange on its top end and both inner and outer bearing surfaces are provided with spaced vertically oriented channels that extend from the top flange down to the lower sleeve end in the base. Circular oil collecting grooves are disposed in the upper and lower surfaces of the radial flange and connected respectively to the inner and outer channels. A washer may be disposed at the shaft step between the shaft and the bearing top. The arrangement is such that oil migrating up the bearing surfaces is blocked from the bowl by collecting in the grooves where it is then directed down the channels and back into the housing base. Thus, the main object is to provide a food processor/bearing arrangement whereby bearing oil is prevented from entering the food processing bowl to contaminate the food, the oil being collected before it can enter the bowl and directed back into the bearing housing.

BRIEF DESCRIPTION OF THE DRAWING

FIG. 1 is a perspective view showing a typical food processor with part of the bowl broken away to show the location of the bearing of the invention;

FIG. 2 is a partial section through the hub structure of the processor;

FIG. 3 is a perspective view of the sleeve bearing employed herein;

FIG. 4 is a cross-sectional view of the bearing on line 4—4 of FIG. 3; and

FIG. 5 is a partial cross-section of the corner in FIG. 4 enlarged to show details better.

DESCRIPTION OF THE PREFERRED EMBODIMENT

The present invention is applicable to any food processing appliance, such as blenders, mixers, or the better known food processors, wherein a vertically driven shaft(s) is supported by a sleeve bearing requiring lubrication and in which it is possible for oil to enter the food being treated. The preferred embodiment is a food processor having the unique bearing which will be described herein.

Referring to FIG. 1, there is shown a food processing appliance including a basic blender base housing 10 which may be L-shaped having a power unit 12 within the housing and which drives the power shaft 14 either direct or through a belt in normal fashion. Disposed on base 10 is removable bowl 16 with a cutting mechanism 18 therein that is driven by shaft 14 to process food. As shown, bowl 16 is a relatively large bowl with axially displaced cutters 18 of the general type of the food processor of U.S. Pat. Nos. 4,153,210 and 4,173,310 both of common assignment. As such, the bowl has a cover 20 secured to an interlock 22 and foodstuff enters the bowl through chute 24. The bowl is locked in position on the base by suitable lugs 26 required because of the high torque developed in operation. Thus, the bowl and cutting mechanism are supported on the base and the cutting mechanism is rotated by vertically-oriented shaft 14 which is driven by suitable linkage from the power unit 12 in the base 10 at selected speeds as chosen by buttons 28. The food processor thus far described is conventional.

In the particular processor described herein, a reducing transmission generally indicated at 30, is used although any suitable coupling means to connect the bowl with the driven shaft 14 will suffice. A typical transmission 30 comprises a blade support base and a hub which extends into the bowl for supporting cutting mechanism 18 thereon. The cutter has an outer molded plastic covering piece 32, the entire unit being dropped down over drive shaft 14 in the customary manner with the cover piece 32 nesting over the outer portion of transmission 30. The transmission support 30 is provided with an internal gear 31, a drive plate 34 on which are mounted a set of idler gears 36 that rotate around pinion gear 38 forming an extension or connection from a motor driven member in the base to drive shaft 14. A transmission is enclosed by a suitable bottom cover to protect it and maintain its lubrication therein. Such structure is fully shown in U.S. Pat. No. 4,153,210 supra.

In accordance with the invention, transmission 30 in the base is formed to support a fixed vertical sleeve bearing 40 preferably press-fitted into an upper extension 42 of the base within the hub as shown in FIG. 2. In order to provide vertical support to drive shaft 14, it is generally step-fitted into the bearing 40 as shown. Bearing 40 is a porous bearing of the type with oil in it and is well known. It is customary to have bearing 40 press against the bottom of drive shaft 14, with or without the interposition of a washer therebetween, to drive shaft 14 and thus the cutter mechanism 18. With the porous oil bearing, as the shaft rotates the bearing heats up and the oil in the bearing expands and migrates up the inner 44 and outer 46 bearing surfaces. As the bearing cools, the oil is sucked back into the porous bearing so there is always oil even though some drips down into the base since the porous bearing design is one that does not recirculate oil. However, in operation and under heat, the oil migrates upwardly where it can freely enter the space between cover piece 32 and upper extension 42 and thus enter the bowl (arrow) containing food. While the oil is not toxic, it should be prevented from entering the food under any circumstances. To this end, the invention, as seen in FIGS. 3-5, modifies the bearing structure especially for application in a food processor where oil is not desired in the bowl. To prevent this, the bearing 40 is provided with a radial extending flange 48 on the upper end of the bearing. This ensures an upper surface 50 and a lower surface 52 of the flange 48. In order to collect the upwardly migrating oil and prevent its entering the bowl, collecting grooves 54 and 56 are disposed in the upper and lower radial flange surfaces 50 and 52 respectively as seen in FIGS. 4 and 5. Thus, all the oil passing up inner bearing surface 44 will encounter upper collecting groove 54 and oil traveling up outer bearing surface 46 encounters the lower collecting groove 56. This oil is then returned to the base housing by a plurality of peripherally spaced and vertically-oriented outer 58 and inner 60 channels to direct the collected oil down the channels and back into the base. As such, none of the oil enters the space between cover piece 32 and upper extension 42 of the transmission and thus the oil is prevented from entering the bowl.

Because of the stepped arrangement of shaft 14 resting directly on top of sleeve bearing 40, the oil enters the grooves before it can escape around the corner between the shaft and the bearing. However, it is desireable to insert a hard metal washer 62 at the step so the edges of the drive shaft 14 will not cut into the relatively soft bearing 40. Since shaft 14 is of a "D" shape with a flat 64 on one side to accommodate the cutter assembly dropped over the shaft, there are some sharp corners on the shaft that could cut into the bearing top and the hardened washer 62 protects the bearing 40. Thus, making the oil impregnated bearing 40 with an extending flange 48 forces the oil to make a right angle turn as it migrates up the bearing. Using the grooves 54 and 56 as collectors, the oil naturally flows into the grooves and is directed back down into the transmission through spaced channels 58 and 60 to ensure no oil enters the bowl.

While there has been described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A food processor including a power unit in a base connected to drive a rotatable hub mounted on a vertically-oriented drive shaft extending into a removable bowl with cutting means on said shaft, the improvement comprising, said shaft being step-fitted into a sleeve oil bearing carried from said base within the hub,
said bearing vertically and rotatably supporting and lubricating said shaft,
a radial extending flange on the top bearing end,
spaced channels in the inner and outer bearing surfaces extending from the top flange end to the lower sleeve end in said base,
circular oil collecting grooves in the upper and lower radial flange surfaces,
said grooves connected respectively to said inner and outer channels,
whereby oil migrating up the bearing surfaces is blocked from said bowl by collecting in said grooves and directed down said channels into the base.

2. Apparatus as described in claim 1 wherein said bearing is a porous oil-impregnated vertical sleeve bearing.

3. Apparatus as described in claim 2 wherein said bearing is press-fitted into said base.

4. Apparatus as described in claim 3 wherein said channels are vertical and a plurality are disposed around each bearing surface.

5. Apparatus as described in claim 4 wherein a washer is disposed at the shaft step between said shaft and bearing top.

6. A housing, a porous oil-impregnated sleeve bearing vertically disposed in said housing, a vertical shaft disposed in said bearing for rotation, a radial extending flange on the top of said sleeve,
spaced channels in the inner and outer bearing surfaces extending from the top to bottom of said surfaces into said housing,
means on said sleeve top blocking passage of oil from said bearing along said shaft,
circular oil collecting grooves in the upper and lower radial flange surfaces,
said grooves connected respectively to said inner and outer channels,
whereby oil migrating up the bearing surfaces is blocked from exiting at the top of said bearing by collecting in said grooves and directed down said channels into the housing.

* * * * *